(12) United States Patent
Yamada et al.

(10) Patent No.: US 8,220,437 B2
(45) Date of Patent: Jul. 17, 2012

(54) VEHICLE FUEL SUPPLY DEVICE AND FUEL FILTER STRUCTURE

(75) Inventors: Hiroshi Yamada, Wako (JP); Minoru Ueda, Wako (JP); Toshiyuki Kubota, Wako (JP); Shiro Kokubu, Wako (JP); Kazuyuki Yoshida, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 356 days.

(21) Appl. No.: 12/532,746

(22) PCT Filed: Feb. 14, 2008

(86) PCT No.: PCT/JP2008/052909
§ 371 (c)(1),
(2), (4) Date: Sep. 23, 2009

(87) PCT Pub. No.: WO2008/126476
PCT Pub. Date: Oct. 23, 2008

(65) Prior Publication Data
US 2010/0059024 A1   Mar. 11, 2010

(30) Foreign Application Priority Data

Mar. 29, 2007 (JP) ................................. 2007-089587
Mar. 29, 2007 (JP) ................................. 2007-089652
Mar. 29, 2007 (JP) ................................. 2007-089683

(51) Int. Cl.
*F02M 37/04* (2006.01)
*F02M 37/00* (2006.01)

(52) U.S. Cl. ...................................... 123/509; 123/510

(58) Field of Classification Search .................. 123/509, 123/510, 511, 495, 497
See application file for complete search history.

(56) References Cited

U.S. PATENT DOCUMENTS

| | | | | |
|---|---|---|---|---|
| 5,231,967 A * | 8/1993 | Baltz et al. | ..................... | 123/497 |
| 5,339,787 A * | 8/1994 | Jungquist et al. | ............. | 123/514 |
| 5,355,860 A * | 10/1994 | Ekstam | ......................... | 123/516 |
| 5,372,115 A * | 12/1994 | Straub et al. | ................... | 123/510 |
| 5,392,750 A * | 2/1995 | Laue et al. | ..................... | 123/509 |
| 5,433,286 A * | 7/1995 | Kumamaru et al. | ........... | 180/219 |
| 5,564,396 A * | 10/1996 | Kleppner et al. | ............. | 123/509 |
| 5,647,330 A * | 7/1997 | Sawert et al. | ................. | 123/509 |
| 5,649,561 A * | 7/1997 | Brandt | ..................... | 137/115.13 |
| 5,972,213 A | 10/1999 | Golan | | |
| 6,029,633 A * | 2/2000 | Brandt | ......................... | 123/509 |
| 6,164,267 A * | 12/2000 | Okada et al. | .................. | 123/510 |
| 6,171,491 B1 * | 1/2001 | Popoff et al. | ................. | 210/235 |
| 6,182,640 B1 * | 2/2001 | Nakashima et al. | .......... | 123/516 |

(Continued)

FOREIGN PATENT DOCUMENTS

JP            01141186        6/1989

(Continued)

*Primary Examiner* — Thomas Moulis
(74) *Attorney, Agent, or Firm* — Rankin, Hill & Clark LLP

(57) ABSTRACT

Secondary fuel filter (143) provided downstream of a fuel pump (92) has a smaller pore size than a primary fuel filter (141) provided upstream of the fuel pump. The secondary fuel filter is covered with a case member (171) and positioned along a center frame (23) of the vehicle. The secondary fuel filter is made of non-woven fabric and formed in a bag shape, and fuel is filtered by the secondary fuel filter as it passes from the interior to the outside of the filter.

17 Claims, 10 Drawing Sheets

U.S. PATENT DOCUMENTS

| | | | |
|---|---|---|---|
| 6,196,200 B1* | 3/2001 | Roche | 123/509 |
| 6,213,143 B1 | 4/2001 | Schwegler et al. | |
| 6,253,740 B1* | 7/2001 | Rembold | 123/509 |
| 6,264,831 B1* | 7/2001 | Hawkins et al. | 210/86 |
| 6,298,832 B1* | 10/2001 | Yamazoe et al. | 123/514 |
| 6,328,883 B1* | 12/2001 | Jensen | 210/136 |
| 6,357,424 B1* | 3/2002 | Sonoda et al. | 123/509 |
| 6,361,684 B1* | 3/2002 | Hawkins et al. | 210/91 |
| 6,468,055 B1* | 10/2002 | Purcell et al. | 417/364 |
| 6,491,029 B2* | 12/2002 | Kondou et al. | 123/509 |
| 6,626,155 B1 | 9/2003 | Ueda et al. | |
| 6,644,693 B2* | 11/2003 | Michisaka et al. | 280/835 |
| 6,719,539 B1* | 4/2004 | Yoshioka | 417/363 |
| 6,907,865 B1 | 6/2005 | Hanby | |
| 6,923,164 B1 | 8/2005 | Mitsudou et al. | 123/509 |
| 6,939,467 B2 | 9/2005 | Deichmann et al. | 210/416.4 |
| 7,210,465 B2* | 5/2007 | Ikeya | 123/510 |
| 7,513,243 B2 | 4/2009 | Nakagawa et al. | 123/509 |
| 7,594,499 B2 | 9/2009 | Suzuki et al. | 123/446 |
| 7,717,466 B2* | 5/2010 | Asamura et al. | 280/835 |
| 7,828,154 B2 | 11/2010 | Ringenberger | 210/416.4 |
| 2004/0062663 A1* | 4/2004 | Ikeya | 417/313 |
| 2004/0118764 A1* | 6/2004 | Miller et al. | 210/258 |
| 2008/0283321 A1* | 11/2008 | Hirano et al. | 180/219 |
| 2008/0308331 A1* | 12/2008 | Trunkenpolz et al. | 180/68.3 |
| 2009/0211959 A1* | 8/2009 | Clint et al. | 210/172.4 |
| 2009/0217911 A1* | 9/2009 | Yokura et al. | 123/457 |
| 2009/0283068 A1* | 11/2009 | Willison | 123/27 R |
| 2010/0294707 A1* | 11/2010 | Abdalla et al. | 210/227 |
| 2011/0073073 A1* | 3/2011 | Ishii | 123/445 |
| 2011/0073075 A1* | 3/2011 | Ishii | 123/457 |
| 2011/0073400 A1* | 3/2011 | Nakajin et al. | 180/219 |

FOREIGN PATENT DOCUMENTS

| | | |
|---|---|---|
| JP | 6007765 Y2 | 3/1994 |
| JP | 10-216423 | 8/1998 |
| JP | 11-294287 | 10/1999 |
| JP | 2002-274466 | 9/2002 |
| JP | 2003-161218 | 6/2003 |
| JP | 2004-278487 | 10/2004 |
| JP | 2006-132362 | 5/2006 |
| JP | 2006-199102 | 8/2006 |
| WO | 9841752 | 9/1998 |
| WO | 99/30027 | 6/1999 |

* cited by examiner

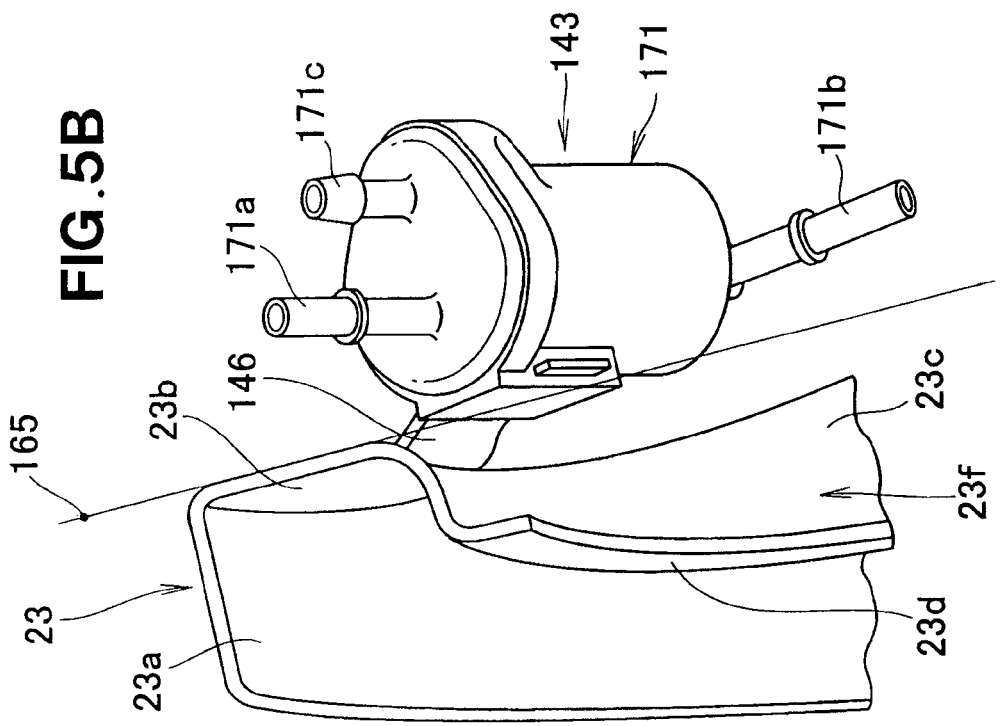
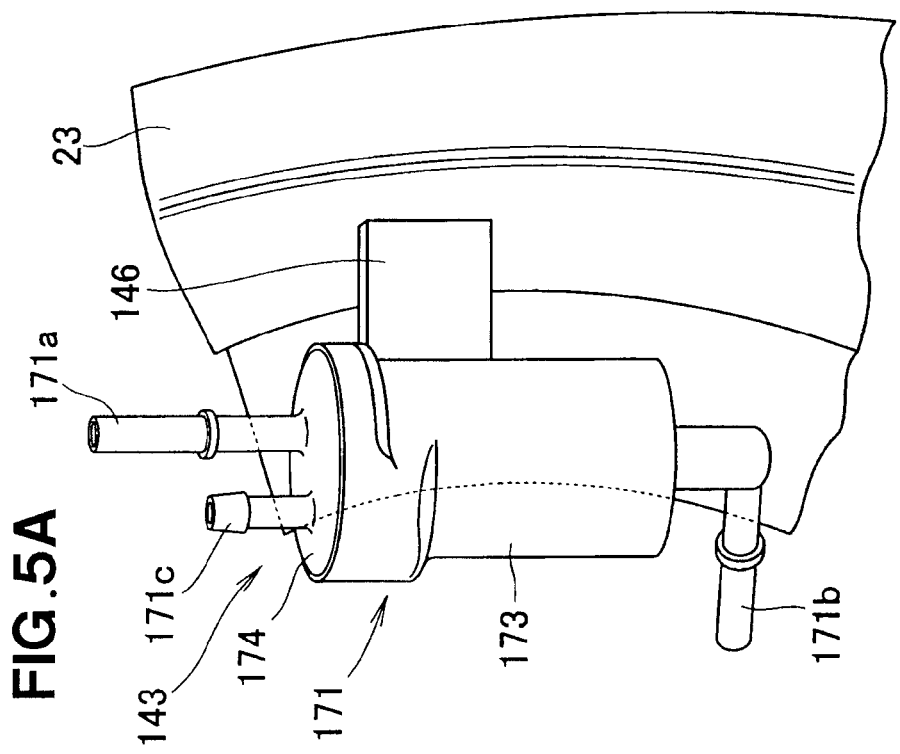

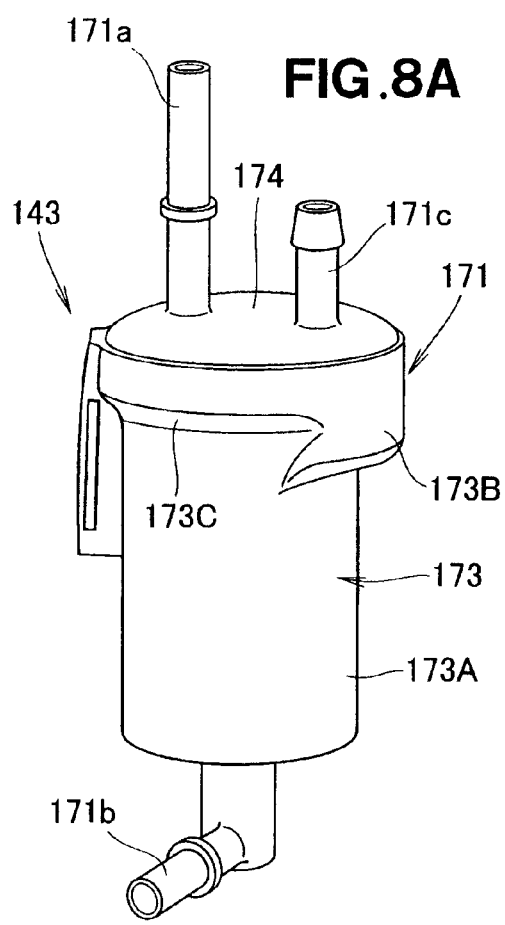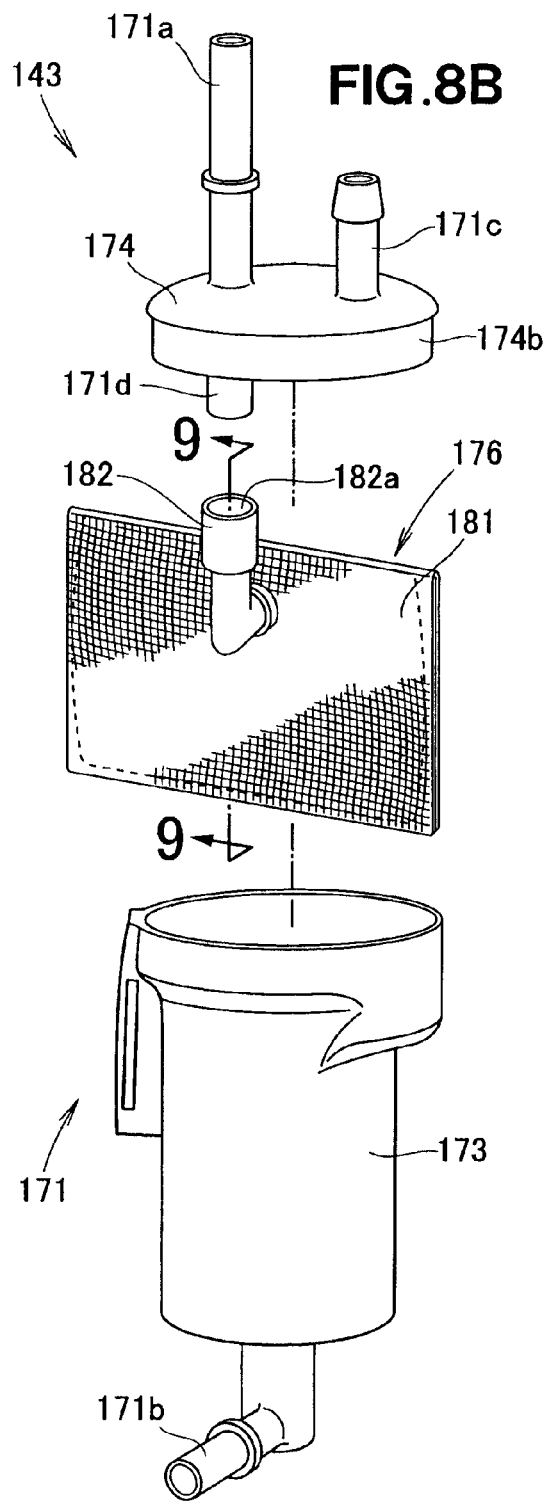

VEHICLE FUEL SUPPLY DEVICE AND FUEL FILTER STRUCTURE

TECHNICAL FIELD

The present invention relates to an improvement in vehicle fuel supply devices, as well as an improvement in fuel filter structures containing a fuel filter made of non-woven fabric.

BACKGROUND ART

Among the conventionally-known vehicle fuel supply devices are ones which include a fuel filter within a fuel tank (for example, International Publication WO2004/072469). In the vehicle fuel supply device disclosed in WO2004/072469, the fuel filter is disposed substantially centrally on the bottom of the fuel tank, a fuel pump unit is disposed in a rear portion of the fuel tank, and the fuel filter and fuel pump unit are interconnected via a fuel pipe.

In cases where fuel, such as ethanol, having fine dust, is used, the fuel filter has to have a small filtering mesh or pore size (i.e., filtering fineness); in these cases, however, the fuel filter has to be replaced in a short cycle, which increases the number of times maintenance work is to be performed. Further, in cases where such a small-pore fuel filter is provided upstream of the fuel pump unit, and when an amount of fuel to be supplied has rapidly increased, e.g. at the time of acceleration of the vehicle, it would be difficult for a necessary amount of the fuel to be supplied because the fuel filter becomes a fuel flow resistance, thus, there arises a need to enhance the capability or performance of the fuel pump unit, which requires increased cost.

Further, there have been known fuel supply devices in which a filter case and a pressure regulator are provided integrally with each other (for example, Japanese Patent Application Laying-Open Publication No. 08-74710 (JP 08-74710). In the fuel supply device disclosed in JP 08-74710, a fuel filter includes: a casing having an inlet, an outlet and a recirculation port; a filter insert of a cylindrical shape disposed inside the casing; and a pressure regulator disposed inside the casing adjacent to the recirculation port. The filter insert has opposite end caps fitted in the casing and supported by a support pipe. The pressure regulator is disposed inside the filter insert, and fuel is filtered as it passes through the filter insert from the outside to the interior of the filter insert.

If an attempt is made to secure a great surface area of the filter insert for an increased filtering capability, the casing has to have an increased size. Further, because the filter insert requires the support pipe, functioning as a frame, and end caps, the fuel supply device requires a great number of component parts and thus requires high cost. Further, the pressure regulator within the casing is subjected to a spatial constraint due to the provision of the filter insert and support pipe, which results in an extremely limited layout freedom of the pressure regulator, fuel suction port, etc. Furthermore, if the pressure regulator is disposed near the recirculation port, an installable location of the recirculation port would be limited.

Furthermore, there have been known fuel filter structures containing a filter element made of non-woven fabric or the like (for example, Japanese Patent Application Laying-Open Publication No. 2003-148267 (JP 2003-148267 A). In the fuel filter structure disclosed in JP 2003-148267 A, a filter cartridge includes a bag-shaped filter element formed of a mesh, non-woven fabric or the like, and a mounting section provided integrally with the bag-shaped filter element. Connection port provided in the mounting section is connected to a suction port of a fuel pump. The bag-shaped filter element is fixed to the mounting section via a suction port member inserted in the element. The suction port member integrally has a frame member for retaining the bag-shaped filter element in an inflated shape.

In cases where a primary fuel filter having a small pore size is employed in a fuel system, such the one disclosed in JP 2003-148267 A, to filter fuel, such as ethanol fuel, having fine (particle) dust, clogging would easily occur in the primary fuel filter. If the surface area of the primary fuel filter is increased in order to extend the life of the primary fuel filter, the primary fuel filter would increase in size, which results in a limited layout freedom and increased cost. Further, because the above-mentioned filter cartridge includes the suction port member, mounting section and frame member in addition to the bag-shaped element, the cartridge would have a large overall size. With vehicles, such as motorcycles, of which there exists a considerable restriction in relation to an available layout space on the vehicle body, it is desirable to construct the fuel supply system in a compact size by use of a non-woven fabric filter that achieves a high filtering efficiency even with a small surface area.

DISCLOSURE OF THE INVENTION

In view of the foregoing, it is an object of the present invention to provide an improved vehicle fuel supply device which is inexpensive, achieves a prolonged exchange or replacement cycle of a fuel filter and can constantly supply a necessary fuel supply amount.

It is another object of the present invention to provide an improved fuel supply device provided with a fuel filter which is compact in size and requires only a small number of component parts and which can enhance a layout freedom of a pressure regulator, fuel suction port, etc.

It is still another object of the present invention to provide an improved fuel filter structure which permits an extended life of a fuel filter, and which achieves a reduced size of the fuel filter by accommodating the filter compactly in a case According to one aspect of the present invention, there is provided an improved vehicle supply device, which comprises: a fuel pump for supplying fuel from a fuel tank to an injector that jets the fuel toward an engine; a primary fuel filter disposed in a fuel passage upstream of the fuel pump; and a secondary fuel filter disposed in the fuel passage downstream of the fuel pump. The secondary fuel filter has a smaller filtering mesh or pore size than the primary fuel filter, and the secondary fuel filter is covered with a case member and disposed along a body frame of the vehicle.

In the conventionally-known fuel supply devices where only one fuel filter is provided, both large (particle) dust and fine (particle) dust are collected by the same fuel filter, so the fuel filter tends to be easily clogged and thus the exchange or replacement cycle of the fuel filter would become very short. In addition, an amount of fuel passing through the fuel filter tends to become small. In the fuel supply device of the present invention, on the other hand, the pore size of the secondary fuel filter is smaller than that of the primary fuel filter; thus, large (particle) dust is collected by the primary fuel filter, and then finer (particle) dust, having passed through the primary fuel filter, is collected by the secondary fuel filter. Because such an inventive arrangement effectively prevents the secondary fuel filter from collecting large dust, the secondary fuel filter can be less prone to clogging, and thus, a replacement frequency of the secondary fuel filter can be reduced. Further, the primary fuel filter too can be less prone to clogging by virtue of its large pore size, and thus, it can be prevented from becoming a fuel flow resistance in the fuel pump. Consequently, a high flow rate of the fuel passing through the primary fuel filter and secondary fuel filter can be reliably maintained over a long period of time. Therefore, a rather inexpensive fuel pump can be employed in the fuel supply device of the invention. As a result, the present invention can achieve longer exchange or replacement cycles of both the primary fuel filter and the secondary fuel filter, so that the number of times maintenance work is to be performed can be reduced. In addition, a high flow rate of the fuel passing through the primary fuel filter and secondary fuel filter can be maintained over a long period of time, and thus, the present invention can appropriately to deal with situations where the required fuel flow rate increases rapidly.

Preferably, the secondary fuel filter is disposed rearwardly of the engine. With this arrangement, the fuel supply device of the invention can make the second fuel filter less subject to heat of the engine as compared to the conventionally-known fuel supply devices where the fuel filter is disposed over the engine.

Preferably, the secondary fuel filter is disposed laterally outwardly of the body frame. Thus, maintenance work, such as replacement of the secondary fuel filter, can be performed with ease from one side of the vehicle.

Preferably, the secondary fuel filter is attached to the body frame via a bracket, and the body frame has an inwardly concaved portion formed in a position corresponding to an inward surface of the secondary fuel filter. Thus, when an external lateral force acts on the fuel secondary fuel filter, for example, the bracket is bent toward the interior of the vehicle body, and the secondary fuel filter moves into the inwardly concaved portion of the vehicle body frame; thus, a movable amount of the secondary fuel filter can be increased, and the increased movable amount allows an external force, acting on the secondary fuel filter, to be absorbed with an increased ease.

Preferably, the secondary fuel filter is covered at an outward side surface thereof with an exterior member. Thus, the outward side surface is not exposed to the outside, so that an enhanced outward appearance of the vehicle can be achieved.

Preferably, a fuel supply pipe is connected to a downstream side of the secondary fuel filter and extends upwardly to a throttle body located above the secondary fuel filter. Thus, air within the secondary fuel filter can readily flow into the fuel injector valve of the throttle body through the fuel supply pipe. This arrangement permits smooth supply of the fuel through the fuel passage including the secondary fuel filter.

Preferably, the vehicle supply device of the invention further comprises a fuel supply pipe disposed to extend upwardly from a fuel discharge port of the case member to the injector, a fuel return port provided on an upper portion of the case member, and a fuel return pipe disposed to extend upwardly from the fuel return port to the fuel tank. Thus, if air is mixed into the fuel line from the fuel pump, the air can be readily caused to exit from the fuel line.

According to another aspect of the present invention, there is provided an improved fuel supply device, which comprises: a fuel filter disposed outside a fuel tank; and a filter case covering an outer surface of the fuel filter; and a pressure regulator provided integrally with the filter case for regulating a pressure within the fuel filter, fuel having passed through the pressure regulator being returned to the fuel tank. The fuel filter is formed in a bag shape, and the fuel is filtered by passing through the fuel filter from the interior to the outside of the fuel filter.

Because the fuel filter is bag-shaped, the filter can be accommodated compactly in the filter case, and the case may be formed in a reduced size. Furthermore, because the fuel filter body is inflated and stably retained in the inflated shape as the fuel is passed through the bag-shaped fuel filter from the interior to the outside, no particular frame member is necessary for the fuel filter. As a consequence, the present invention can reduce the number of necessary component parts of the fuel filter.

Moreover, because the fuel filter to be accommodated within the case can be readily changed in shape as necessary, the present invention can enhance the layout freedom of the pressure regulator and fuel return port provided near the pressure regulator.

Preferably, the fuel filter is disposed downstream of a fuel pump, and the pressure regulator is disposed downstream of the fuel filter. Thus, the fuel having passed through the fuel filter body is returned into the fuel tank, via the pressure regulator, with most of the dust removed or filtered out from the fuel. Consequently, in the case where another filter, e.g. a primary fuel filter, is provided within the fuel pump, an amount of dust to be filtered out through the primary fuel filter can be significantly reduced. As a result, the present invention can achieve a longer exchange or replacement cycle of the primary fuel filter, so that the number of times maintenance work is to be performed can be reduced.

Preferably, the fuel supply device further comprises a fuel return pipe disposed to extend upwardly from the pressure regulator to the fuel tank located above the pressure regulator. Thus, air accumulated within the fuel filter can readily exit, through the pressure regulator, into the fuel tank located above the fuel filter. As a result, the present invention allows the fuel supply through the fuel passage to be effected smoothly.

Preferably, the fuel supply device further comprises a fuel supply pipe for supplying the fuel from the fuel tank to the fuel filter, and the fuel supply pipe and the fuel return pipe differ from each other in length and outer diameter. With the fuel supply pipe and the fuel return pipe having different lengths and outer diameters or widths, these fuel supply pipe and the fuel return pipe are easily distinguishable from each other. Thus, the present invention can prevent an assembly error in assembling the fuel supply pipe and fuel return pipe to the fuel filter.

Preferably, the filter case includes a case body and a case cover. Fuel suction port and fuel return port are disposed offset from the center axis of the case cover; thus, if the pressure regulator is provided near the fuel return port, the present invention can enhance the layout and shape freedom of the pressure regulator, which can make the filter case compact in size.

Preferably, the filter case has a stepped portion projecting radially outwardly from the filter case, and the pressure regulator has a lower end supported on the stepped portion. Thus, the present invention can simplify the structure for supporting the pressure regulator, with the result that cost increase of the filter case and fuel filter can be minimized.

According to still another aspect of the present invention, there is provided an improved fuel filter structure, which comprises a primary fuel filter disposed upstream of a fuel pump; and a secondary fuel filter disposed downstream of the fuel pump and made of non-woven fabric having a pore size smaller than a pore size of the primary fuel filter.

By the provision of the secondary fuel filter made of non-woven fabric having a smaller pore size than the primary fuel filter, the primary fuel filter may have a greater pore size, and the life of the primary fuel filter can be extended even further. Because the primary fuel filter is provided upstream of the fuel pump, the life of the fuel pump too can be prolonged if the primary fuel filter is set to such a relatively great pore size that does not substantively adversely influence the fuel pump. Moreover, by the secondary fuel filter being made of non-woven fabric, the effective filtering area can be increased, and thus, the fuel filtering efficiency can be enhanced to a significant degree. Further, the secondary fuel filter may have a reduced surface area, so that the secondary fuel filter can be constructed in a compact size. In addition, because the fuel filtering is performed cooperatively by the primary fuel filter and secondary fuel filter, the present invention can significantly extend the life of the secondary fuel filter as compared to the case where only one such fuel filter is provided.

According to still another aspect of the present invention, there is provided an improved fuel filter structure, which comprises: a case; and a filter made of non-woven fabric, the filter being accommodated in the case in a rolled or wound form. With the filter accommodated compactly in the case in a rolled or wound configuration having a reduced overall size, the case and hence the fuel filter may have a smaller size.

Preferably, the filter has a bag shape, and the filter filters fuel by passing therethrough the fuel from an interior of the filter to the outside of the filter. As the fuel is supplied into the bag-shaped filter, the filter inflates so that the fuel contained in the filter flows through the filter to the outside due to increase in inner pressure within the filter, during which dust mixed in the fuel is removed or filtered out from the fuel. Because the filter is inflated and retained in the inflated shape, no particular frame member for retaining the inflated shape is required; thus, the present invention can reduce the necessary cost of the fuel filter and can even further reduce the size of the filter.

Preferably, an entry port to the filter is connected to the inner surface of the rolled or wound filter in an outwardly-facing orientation. Thus, no projecting portion is formed in the outer wall of the rolled or cylindrically-wound portion of the filter, which permits reduction in size of the case. In addition, because the inner space of the case can be utilized efficiently in the aforementioned manner, the filter body may have an increased area.

Preferably, the case has a plurality of convex portions projecting inwardly from the inner surface, and the filter is supported partly by the convex portions. Thus, when the fuel flows into the filter, gaps can be secured, by the convex portions, between the inflated filter and the inner surface of the case, and the fuel within the filter is allowed to flow through the filter into the gaps. Consequently, the present invention can suppress a decrease in the fuel flow rate, or stagnation of the fuel, and can thus enhance the fuel filtering efficiency.

BRIEF DESCRIPTION OF THE DRAWINGS

Certain preferred embodiments of the present invention will be described in detail below, by way of example only, with reference to the accompanying drawings, in which:

FIGS. 5A and 5B are side and perspective views, respectively, illustrating a secondary fuel filter and mounting structure therefor in the embodiment of the invention;

FIGS. 8A and 8B are perspective and exploded fragmentary views, respectively, of the secondary fuel filter;

FIGS. 9A and 9B are views explanatory of a filter element employed in the instant embodiment of the invention, of which FIG. 9A is a sectional view taken along line 9-9 of FIG. 8B and FIG. 9B is a perspective view showing the filter element as accommodated in a filter case.

BEST MODE FOR CARRYING OUT THE INVENTION

Figure 1:
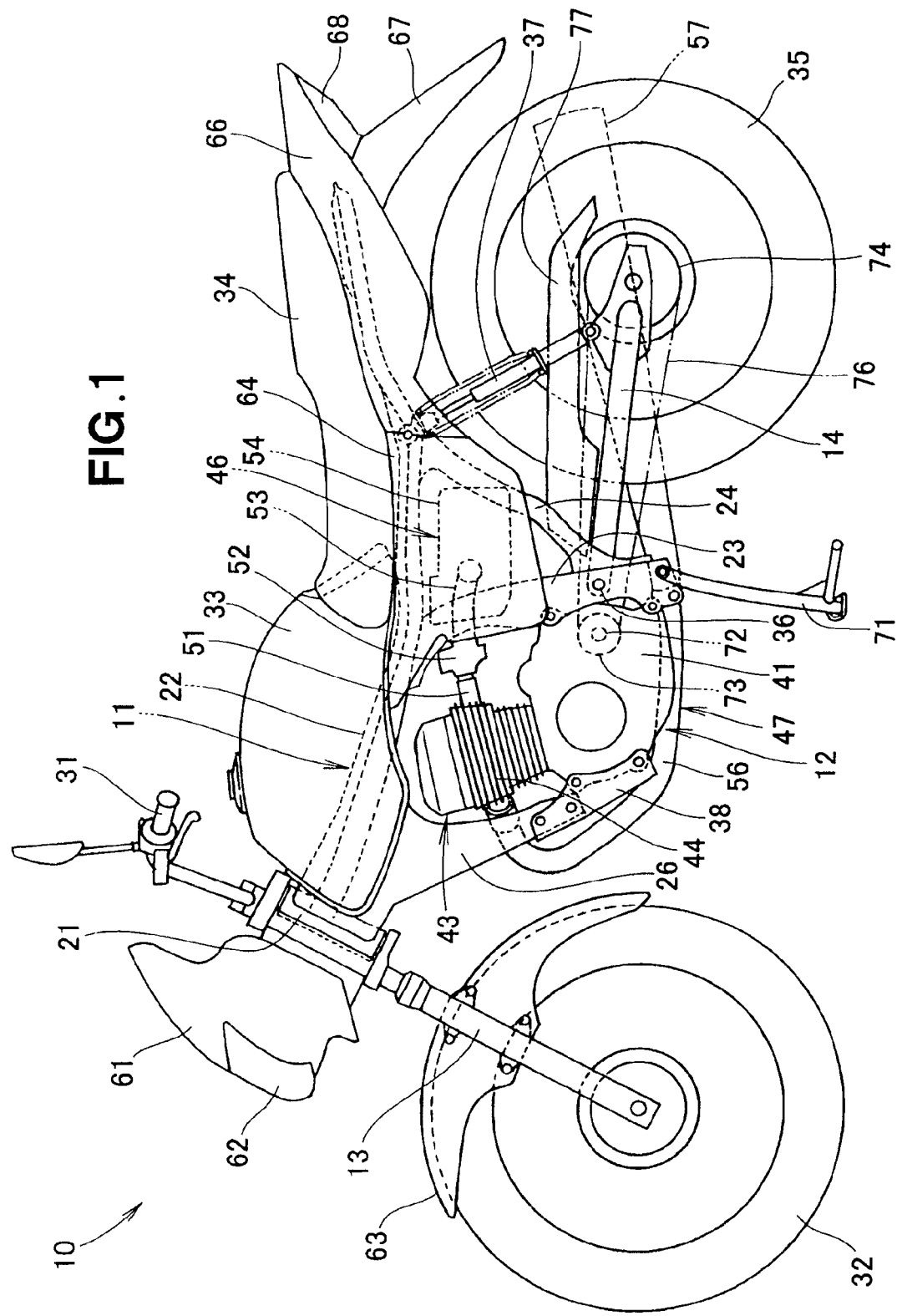
FIG. 1 is a side view of a vehicle that is provided with a fuel filter device according to an embodiment of the present invention.

Initial reference is made to FIG. 1 showing in side elevation a vehicle provided with a fuel filter device and fuel filter structure according to an embodiment of the present invention. The vehicle 10 is a motorcycle which includes an engine 12 disposed substantially centrally on a vehicle body frame 11, a front fork 13 steerably supported on a front end portion of the vehicle body frame 11, and a rear fork 14 vertically pivotably supported on a lower rear portion of the vehicle body frame 11. The vehicle 10 uses, as its main fuel, ethanol, gasoline or a mixture of gasoline and ethanol, and uses, as its subsidiary fuel, gasoline or a mixture of gasoline and ethanol (having a higher mixing ratio of gasoline to ethanol than that in the main fuel) only at the time of engine startup, e.g. when the engine startup is not smooth otherwise due to a low temperature.

The vehicle body frame 11 is a framework formed by joining a plurality of press-molded parts, and it includes a head pipe 21 provided at its front end, a main frame 22 extending rearward from the head pipe 21, a center frame 23 extending downward from an intermediate portion of the main frame 22, a sub frame 24 coupled to a rear portion of the main frame 22 and to a lower portion of the center frame 23, and a down frame 26 extending rearwardly and downwardly from the head pipe 21.

The head pipe 21 has the front fork 13 pivotably mounted thereon, and a handle bar 31 and front (road) wheel 32 are attached to upper and lower portions, respectively, of the front fork 13. Main fuel tank 33 for storing the main fuel is mounted on and across a front portion of the main frame 22, and a seat 34 is mounted on a rear portion of the main frame 22. Subsidiary fuel tank for storing the subsidiary fuel is provided within the main fuel tank 33.

The center frame 23 supports the engine 12 together with the down frame 26. Pivot shaft 36 supported by the center frame 23 serves as a shaft that permits vertical pivoting movement of the rear fork 14. Rear (road) wheel 35 is attached to the rear end of the rear fork 14.

Rear cushion unit 37 is attached to and extending between respective rear portions of the rear fork 14 and main frame 22. The down frame 26 supports the engine 12 via a bracket 38.

Transmission 41 is provided integrally with a rear portion of the engine 12, and a cylinder head 44 is mounted to an upwardly-extending cylinder section 43 of the engine 12. Air intake device 46 is connected to a rear portion of the cylinder head 44, and an exhaust device 47 is connected to a front portion of the cylinder head 44.

The air intake device 46 includes an intake pipe 51 connected at its one end to the cylinder head 44, a throttle body 52 connected at its one end to the other end of the intake pipe 51, and an air cleaner 54 connected to the other end of the throttle body 52 via a connecting tube 53.

The exhaust device 47 includes an exhaust pipe 56 connected at its one end to a front portion of the cylinder head 44 and extending downwardly and rearwardly from the front of the engine 12, and a muffler 57 connected to the other end of the exhaust pipe 56 and extending rearwardly.

In the figure, reference numeral 61 denotes a front cowl, 62 a head lamp, 63 a front fender, 64 a side cover covering the sides of the air cleaner 54, 66 a rear side cover, 67 a rear fender, 68 a tail lamp, 71 a main stand, 72 an output shaft of the transmission 41, 73 a driving sprocket attached to the output shaft 72, 74 a driven sprocket attached integrally to the rear wheel 35, 76 a chain extending between and wound at its opposite ends on the driving and driven sprockets 73 and 74, and 77 a chain cover.

Figure 2:
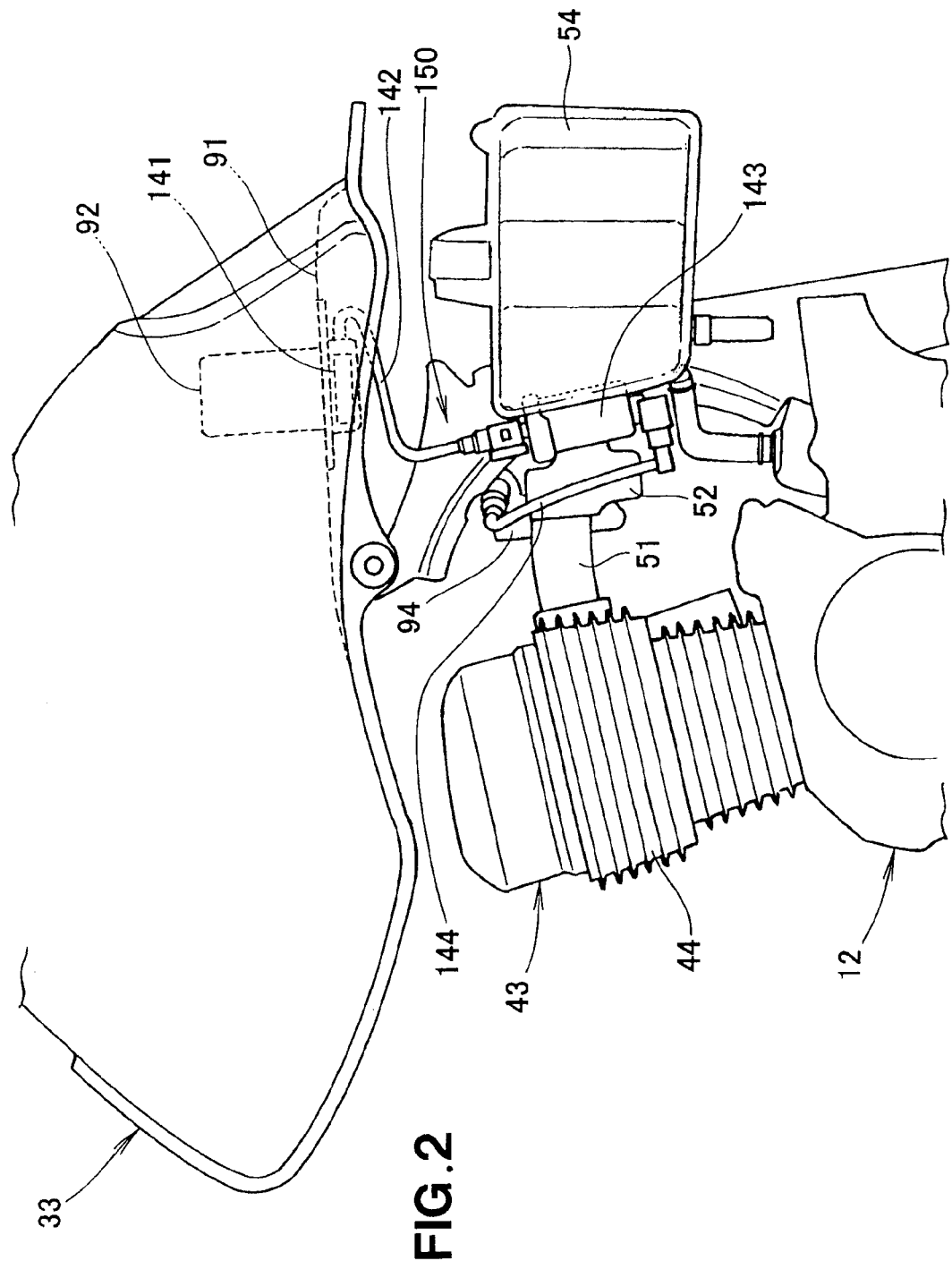
FIG. 2 is a side view showing principal sections of the fuel supply device according to the embodiment of the invention.

FIG. 2 is a side view showing principal sections of the fuel supply device according to the embodiment of the invention. Primary fuel filter 141 for filtering the main fuel (hereinafter referred to simply as "fuel") is provided within a fuel pump 92 that is in turn attached to a bottom portion 91 of the main fuel tank 33, and a secondary fuel filter 143 for further filtering the fuel is connected to the fuel pump 92 via a fuel supply pipe 142 made of resin. Fuel supply pipe 144 is connected at its one end to the secondary fuel filter 143 and extends upwardly to be connected at its other end to a fuel injector valve (injector) 94 that is provided on the throttle body 52 located above the secondary fuel filter 143; that is, the fuel injector valve 94 is connected to the secondary fuel filter 143 via the pipe 144. The secondary fuel filter 143 is located downstream of the primary fuel filter 143 provided within the fuel pump 92. As will be later described in relation to FIG. 3, fuel delivery piping (not shown in FIG. 2) extends from the secondary fuel filter 143 into the main fuel tank 33.

Left side (i.e., side visible in FIG. 2) of the secondary fuel filter 143 is covered with the side cover 64 (see FIG. 1) and thus is not exposed to the outside, so that an enhanced outward appearance of the vehicle can be achieved.

The secondary fuel filter 143 has a filtering mesh or pore size smaller than that of the primary fuel filter 141; for example, the pore size of the secondary fuel filter 143 is 30 µm, while the pore size of the primary fuel filter 141 is 70 µm. Thus, the primary fuel filter 141 collects relatively large (particle) dust, and the secondary fuel filter 143 can collect finer (particle) dust having passed through the primary fuel filter 141. Because such an arrangement prevents the secondary fuel filter 143 from collecting relatively large dust, the secondary fuel filter 143 can be less prone to clogging. Further, the primary fuel filter 141 too can be less prone to clogging by virtue of its large pore size.

Consequently, the instant embodiment can achieve longer exchange or replacement cycles of both the primary fuel filter 141 and the secondary fuel filter 143, so that the number of times maintenance work is to be performed can be reduced. In addition, a high flow rate of the fuel passing through the primary fuel filter 141 and secondary fuel filter 143 can be maintained over a long period of time. As a result, the instant embodiment can appropriately deal with situations where the required fuel flow rate increases rapidly at the time of start, acceleration or the like of the vehicle.

Further, because the secondary fuel filter 143 is disposed rearwardly of the engine 12, the intake device 46 (more specifically, the throttle body 52) and the secondary fuel filter 143 can be positioned close to each other. Thus, the instant embodiment can decrease the length of the fuel supply pipe 144 that connects between the secondary fuel filter 143 and the fuel injector valve 94 of the throttle body 52, so that necessary fuel piping installation can be significantly facilitated.

Figure 3:
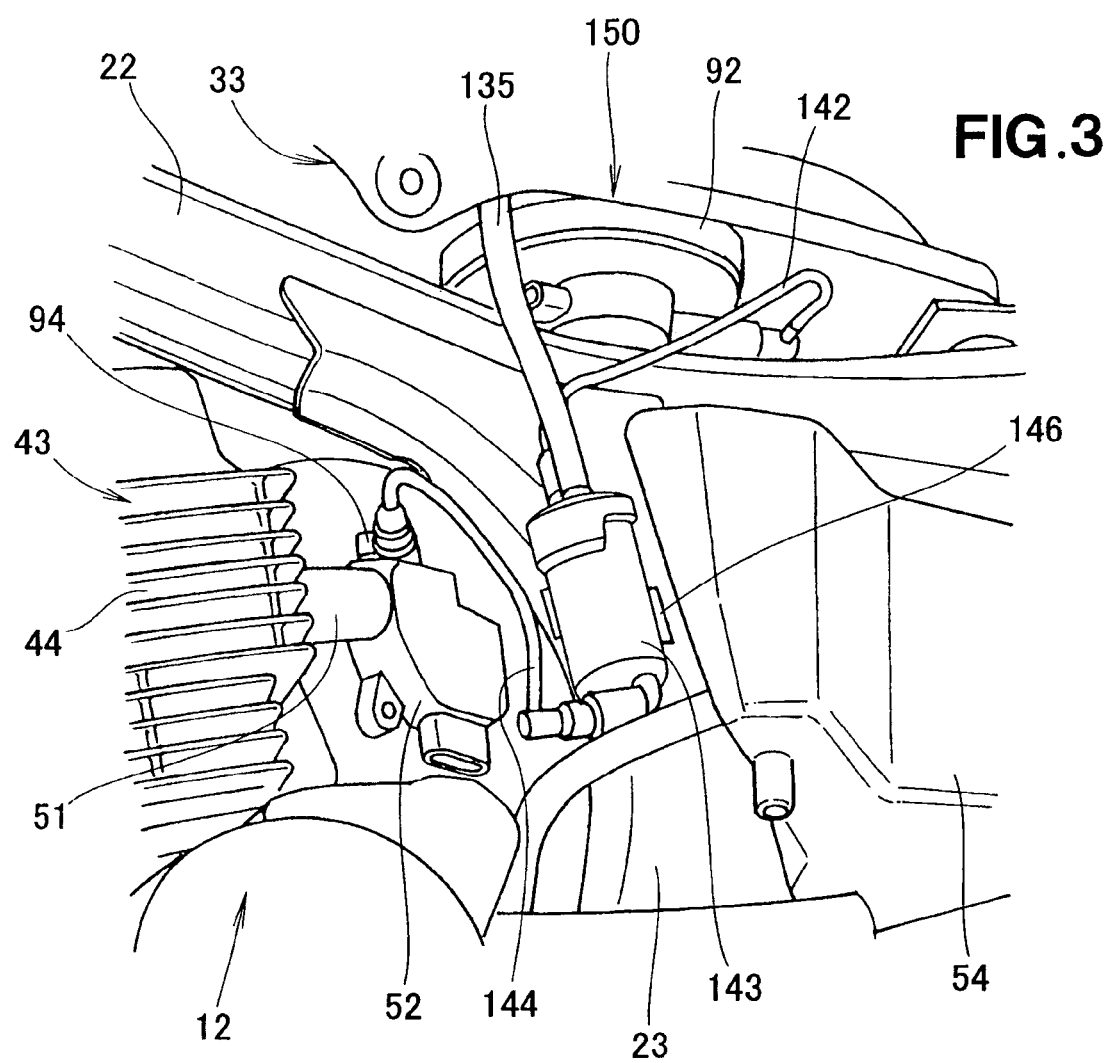
FIG. 3 is a perspective view showing the principal sections of the fuel supply device according to the embodiment of the invention.

FIG. 3 is a perspective view showing the principal sections of the fuel supply device according to the embodiment of the invention. The secondary fuel filter 143 is disposed laterally outwardly of the center frame 23 and fixedly attached to the center frame 23 via a bracket 146. Fuel return pipe 135 extends upwardly from the secondary fuel filter 143 to be connected to the main fuel tank 33.

The fuel return pipe 135 is, for example, in the form of a rubber hose, which is smaller in length and greater in outer diameter or width than the resin-made fuel supply pipe 142 and thus readily distinguishable from the fuel supply pipe 142; therefore, it is possible to prevent an assembly error in assembling the fuel supply pipe 142 and fuel return pipe 135 to the secondary fuel filter 143.

The fuel supply pipe 144 is disposed to extend from the downstream side of the secondary fuel filter 143 upwardly to the throttle body 52 (more specifically, to the fuel injector valve 94 of the throttle body 52) located above the secondary fuel filter 143. Thus, air within the secondary fuel filter 143 readily exits from the filter 143 and flows into the fuel injector valve 94 of the throttle body 52 through the fuel supply pipe 144; this arrangement permits smooth supply of the fuel through a fuel passage including the secondary fuel filter 143.

The above-described structural components provided in a region from the main fuel tank 33 to the fuel injector valve 94, i.e. the main fuel tank 33, primary fuel filter 141 (see FIG. 2), fuel pump 92, fuel supply pipe 142, secondary fuel filter 143, fuel return pipe 135, fuel supply pipe 144, throttle body 52 and fuel injector valve 94, together constitute the fuel supply device 150 of the invention.

By providing the secondary fuel filter 143 laterally outwardly of the center frame 23 as noted above, maintenance work, such as replacement of the secondary fuel filter 143, can be performed with ease from one side of the vehicle. In addition, it is possible to increase the capacity of the secondary fuel filter 143, so that undesired pulsation of the fuel can be decreased with an increase ease.

Figure 4:
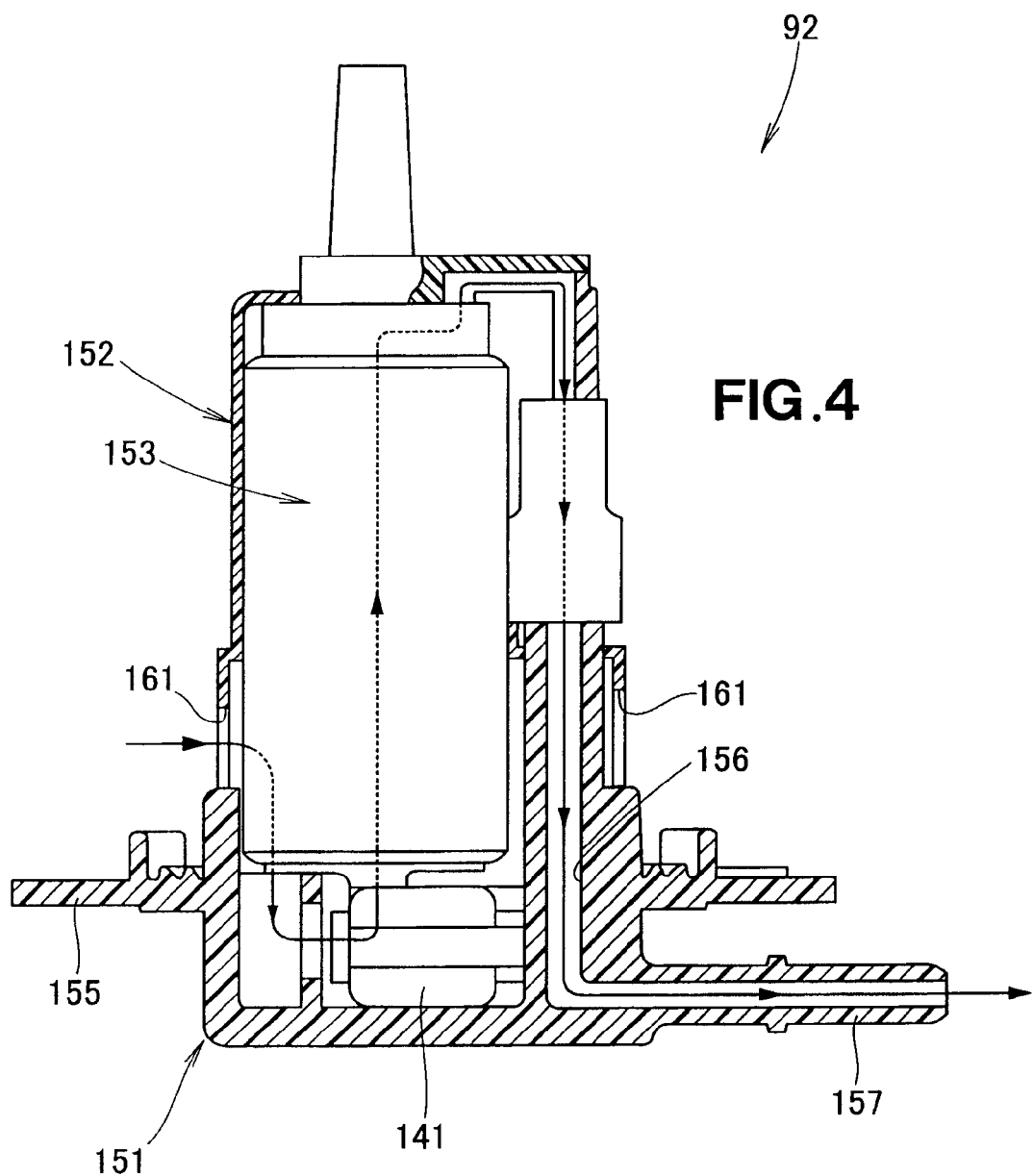
FIG. 4 is a sectional view of a fuel pump employed in the fuel supply device according to the embodiment of the invention.

FIG. 4 is a sectional view of the fuel pump employed in the fuel supply device 150. The fuel pump 92 includes a resin-made lower case 151 fixedly attached to the main fuel tank 33 (see FIG. 2), a metal- or resin-made upper case 152 fixedly attached to an upper portion of the lower case 151, and a drive section 153 disposed inside the upper case 151 and lower case 152.

The lower case 151 includes a flange portion 155 for attachment to the main fuel tank 33, a fuel passage 156 through which the fuel fed by the drive section 153 flows, and a discharge port 157 connected to the fuel passage 156. The primary fuel filter 141 is accommodated in the lower case 151.

The upper case 152 has a plurality of suction ports 161 formed therein for sucking in the fuel. The drive section 153 includes a motor, and a pump driven by the motor. The primary fuel filter 141 is disposed upstream of the drive section 153 of the fuel pump 92.

As indicated by arrows in the figure, the fuel is sucked in through the suction ports 161 of the upper case 152 and passes through the primary fuel filter 141, after which the fuel ascends in the drive section 153 and passes through the fuel passage 156 to the discharge port 157. Then, via the discharge port 157, the fuel flows into the fuel supply pipe 142 of FIG. 2 and then reaches the secondary fuel filter 143 shown in FIG. 2.

FIGS. 5A and 5B are side and perspective views, respectively, explanatory of the secondary fuel filter 143 and mounting structure therefor in the instant embodiment.

As shown in FIG. 5A, the bracket 146, which has a plate shape and is made of metal, is fixed to the center frame 23, and the secondary fuel filter 143 is supported by the bracket 146.

The secondary fuel filter 143 includes a case (member) 171 made of resin, and a filter body 181 (shown in FIG. 7) made of non-woven fabric and accommodated within the case 171. The case 171 includes a tubular case body 173, and a case cover 174 that closes an upper opening of the case body 173.

The case body 173 has a fuel discharge port 171b provided in its bottom portion. The case cover 174 has, on its top portion, a fuel suction port 171a and a fuel return port 171c for returning the fuel to the main fuel tank 33 (see FIG. 2).

As shown in FIG. 5B, the center frame 23 includes a lateral portion 23a that extends in a width (i.e., left-right) direction of the vehicle, a longitudinal portion 23b that extends in a forward direction of the vehicle from an end of the lateral portion 23a, a curved portion 23c that extends in forward and inward directions of the vehicle, and a forward portion 23d that extends in the forward direction of the vehicle from the front end of the curved portion 23c. The bracket 146 is fixed to the longitudinal portion 23b, and the secondary fuel filter 143 is fixed to the bracket 146.

By forming the center frame 23 in a bent configuration as noted above, it is possible to enhance the rigidity, particularly bending rigidity, of the center frame 23 in front-rear and width directions of the vehicle.

If an imaginary straight line 165 is drawn along the longitudinal portion 23b as illustrated in FIG. 5B, the secondary fuel filter 143 is located laterally outwardly of the straight line 165 and hence the center frame 23. The center frame 23 has, in its outward side surface portion corresponding in position to the inward surface of the secondary fuel filter 143, a stepped portion 23f as a portion concaved in the inward direction of the vehicle body, that is constituted by the above-mentioned curved portion 23c and forward portion 23d.

Figure 6A:
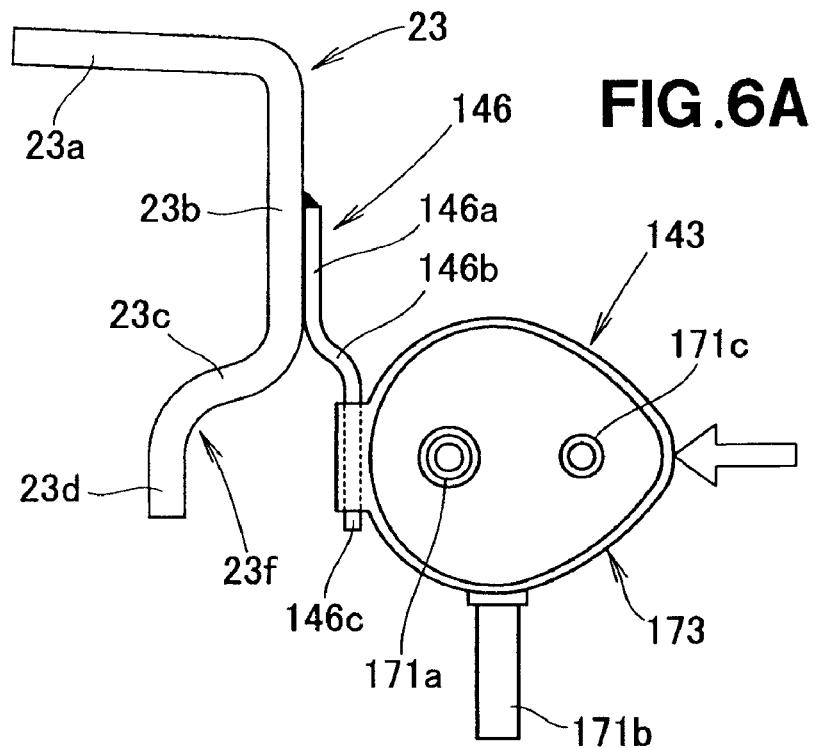
FIGS. 6A and 6B are plan views showing general behavior of the mounting structure for the secondary fuel filter.
Figure 6B:
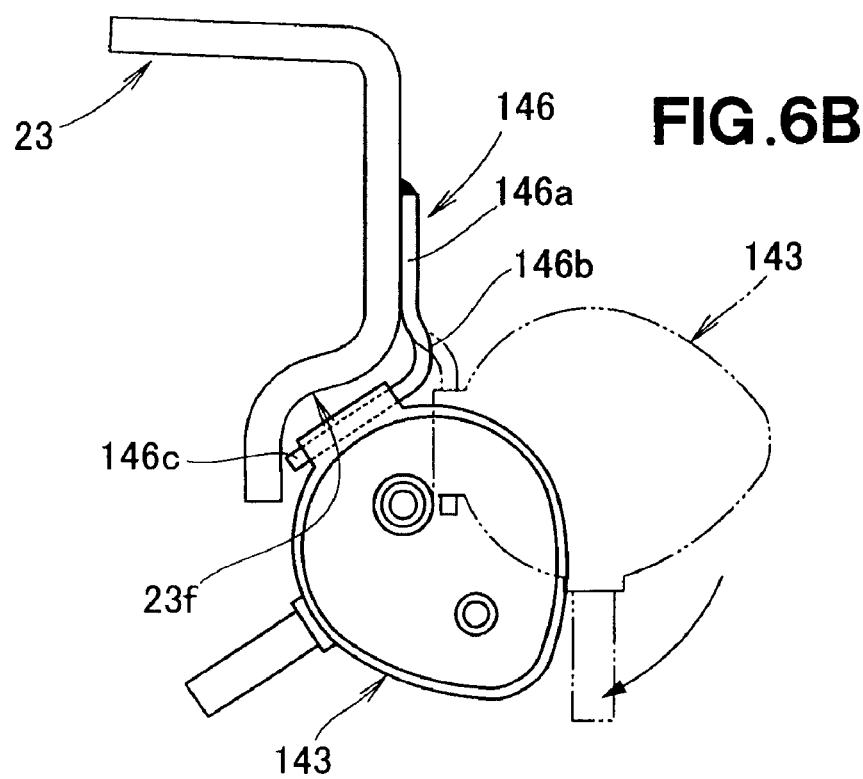

FIGS. 6A and 6B are plan views showing general behavior of the mounting structure for the secondary fuel filter 143.

In FIG. 6A, the bracket 146 includes a rear flat plate portion 146a joined by welding to the longitudinal portion 23b of the center frame 23, a bent portion 146b that is bent laterally outwardly from the front end of the rear flat plate portion 146a, and a front flat plate portion 146c that extends in the forward direction of the vehicle from the front end of the bent portion 146b. The front flat plate portion 146c is attached to a case body 173 of the secondary fuel filter 143 by extending through a portion of the case body 173.

For example, when an external force acts on the secondary fuel filter 143 from a side as indicated by a white arrow, the external force is transmitted to the bracket 146 via the secondary fuel filter 143, so that the bent portion 146b and portion located forward of the bent portion 146b are bent toward the center frame 23, as shown in FIG. 6B. At that time, the secondary fuel filter 143 moves into the stepped or inwardly concaved portion 23f of the center frame 23.

With the inwardly concaved portion 23f formed in the center frame 23 so as to allow the secondary fuel filter 143 to move into the inwardly concaved portion 23f when an external force acts on the secondary fuel filter 143, a movable amount of the secondary fuel filter 143 can be increased, and the increased movable amount allows an external force, acting on the secondary fuel filter, to be absorbed with an increased ease.

Figure 7:
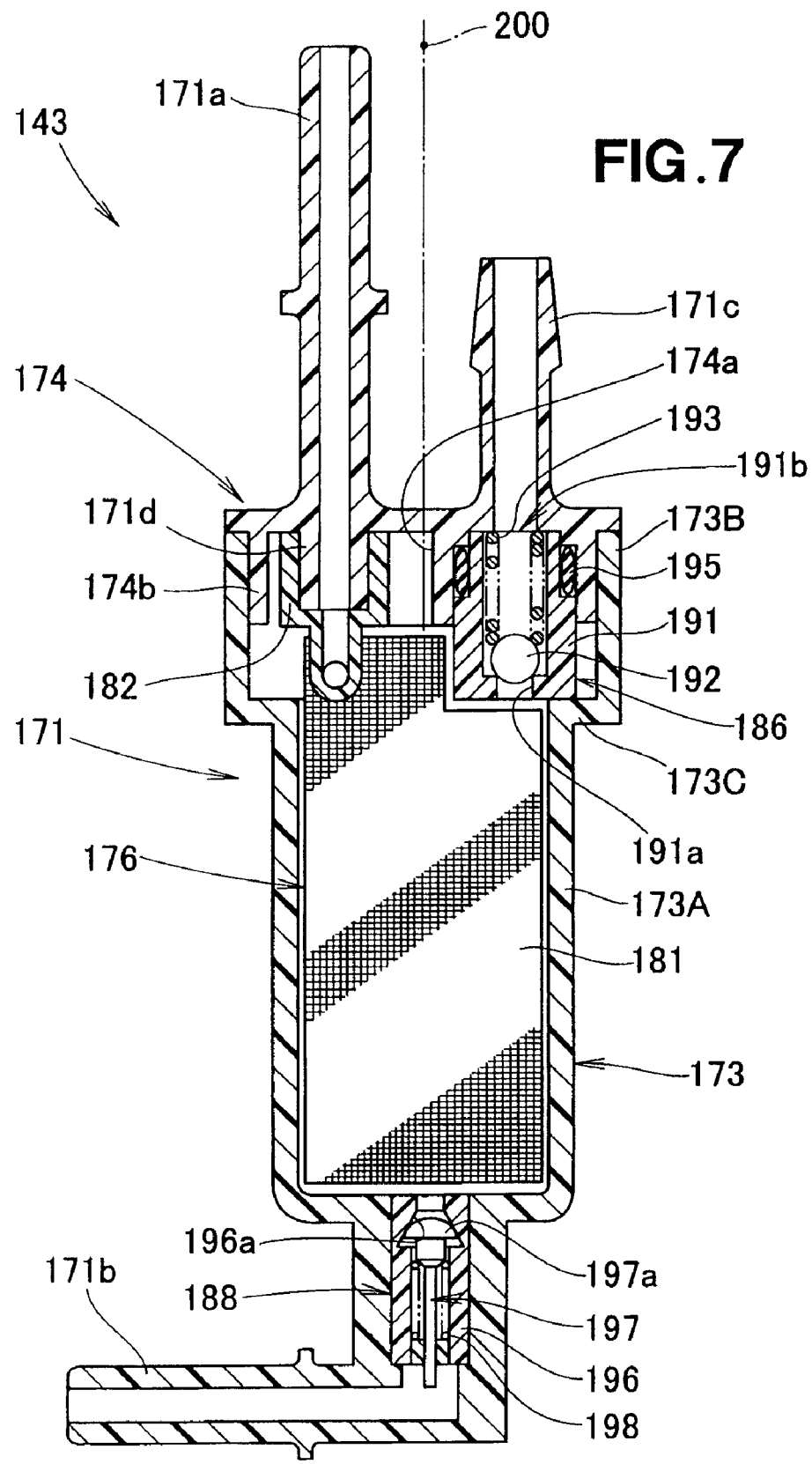
FIG. 7 is a sectional view of the secondary fuel filter.

FIG. 7 is a sectional view of the secondary fuel filter 143 employed in the instant embodiment of the invention. The secondary fuel filter 143 includes the case 171 having the case body 173 and the case cover 174 closing the upper opening of the case body 173 as noted above, and a filter element 176 accommodated within the case 171. The case body 173 has the fuel suction port 171a for sucking in the fuel, and the fuel return port 171c for returning the fuel to the main fuel tank 33 (see FIG. 3). The case cover 174 has the fuel discharge port 171b for discharging the fuel.

The filter element 176 includes the bag-shaped filter body 181 made of non-woven fabric, and a connection port 182 that communicates with the interior of the filter body 181 and is connected to the fuel suction port 171a of the case cover 174.

The secondary fuel filter 143 also includes a pressure regulator 186 provided integrally with the lower surface of the case cover 174, and, when a fuel pressure within the secondary fuel filter 143 has exceeded a predetermined value, this pressure regulator 186 operates to return the fuel to the main fuel tank 33 to thereby regulate the fuel pressure within the secondary fuel filter 143. In addition, a check valve 188 is disposed within the fuel discharge port 171b of the case body 173.

The pressure regulator 186 includes a resin-made, bottomed cylindrical regulator case 191 fitted in a cylindrical portion 174a formed integrally with the lower surface of the case cover 174, a steel-made spherical valve member 192 for opening/closing a through-hole 191a formed in the bottom of the regulator case 191, and a compression coil spring 193 for normally urging the valve member 192 to close the through-hole 191a. The through-hole 191a communicates with the interior of the filter element 176, and an upper opening 191b of the regulator case 191 communicates with the interior of the fuel return port 171c.

The regulator case 191 has its lower end face 191A supported on a stepped portion 173C connecting between a small-diameter tube portion 173A and a large-diameter tube portion 173B of the case body 173.

Reference numeral 174b denotes an annular fitting portion that is formed integrally with the lower surface of the case cover 174 and fits in an upper portion of the case body 173, and 195 denotes an O ring that forms a seal between the tubular portion 174a and the regulator case 191.

The check valve 188 includes a valve case 196, a valve body 197 disposed for vertical movement within the valve case 196, and a spring 198 for normally pressing a semi-spherical head portion 197a of the valve body 197 against a tapered valve seat 196a. In the figure, the valve body 197 closes the tapered valve seat 196a.

The fuel within the case 171 is allowed to flow from within the secondary fuel filter 143 to the outside (i.e., to the fuel injector valve 94 (see FIG. 3)) through the fuel discharge port 171b by pushing down the valve body 197 against the resilient biasing force of the spring 198. Backflow of the fuel from the fuel injector valve 94 into the secondary fuel filter 143 can be prevented by the valve body 197 ascending so that the head portion 197a abuts against the valve seat 196a to close the fuel passage.

During operation of the engine 12, the fuel pump 92 operates in such a manner that the pressure from the fuel pump 92 pushes down the valve body 197 against the resilient biasing force of the spring 198, thereby causing the fuel to flow to the fuel injector valve 94, (see FIG. 2) via the fuel discharge port 171*b* and fuel supply pipe 144, so that the fuel injector valve 94 jets the fuel toward the engine.

As the engine 12 is deactivated, the fuel pump 92 is deactivated, so the valve body 197 is pushed up by the spring 198 to abut against the valve seat 196*a*, thereby closing the fuel passage. Thus, the fuel passage extending from the fuel discharge port 171*b* to the fuel injector valve 94 is maintained at high pressure.

After deactivation of the fuel pump 92, it is desirable to keep the inner pressure in the fuel line at a high level line in order to ensure that the fuel passage works appropriately immediately after the fuel pump 92 is activated next. However, even if the inner pressure in the fuel line is maintained at a high level. the inner pressure would gradually decrease by a minute amount of the fuel leaking from the pressure regulator 186 to the discharge side. This is why the check valve 188 is provided on the discharge side of the pressure regulator 186.

FIGS. 8A and 8B are perspective and exploded fragmentary views, respectively, of the secondary fuel filter 143.

In the case body 173, the large-diameter tube portion 173B is formed continuously with the top of the small-diameter tube portion 173A via the stepped connecting portion 173C. The pressure regulator 186 shown in FIG. 7 is disposed within the large-diameter tube portion 173B. Internal passage 171*d* communicating with the fuel suction port 171*a* is provided integrally with the case cover 174. The filter element 176 has the bag-shaped filter body 181 made of non-woven fabric, a fuel passage 182*a* communicating with the interior of the bag-shaped filter body 181, and the above-mentioned connection port 182 connected to the internal passage 171*d* of the case cover 174. The connection port 182 is disposed at a substantial middle position of the width of the filter body 181.

Figure 9A:
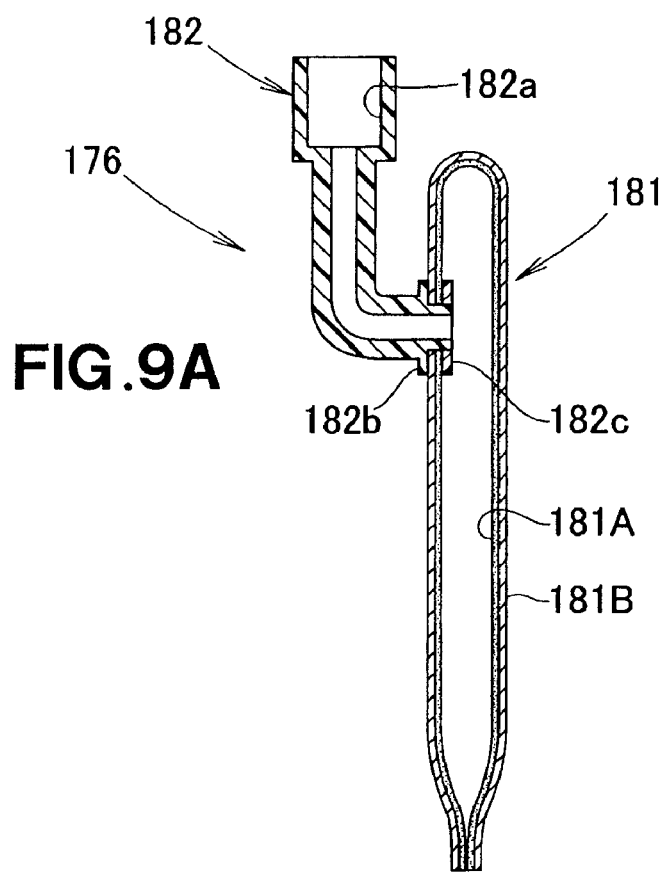
Figure 9B:
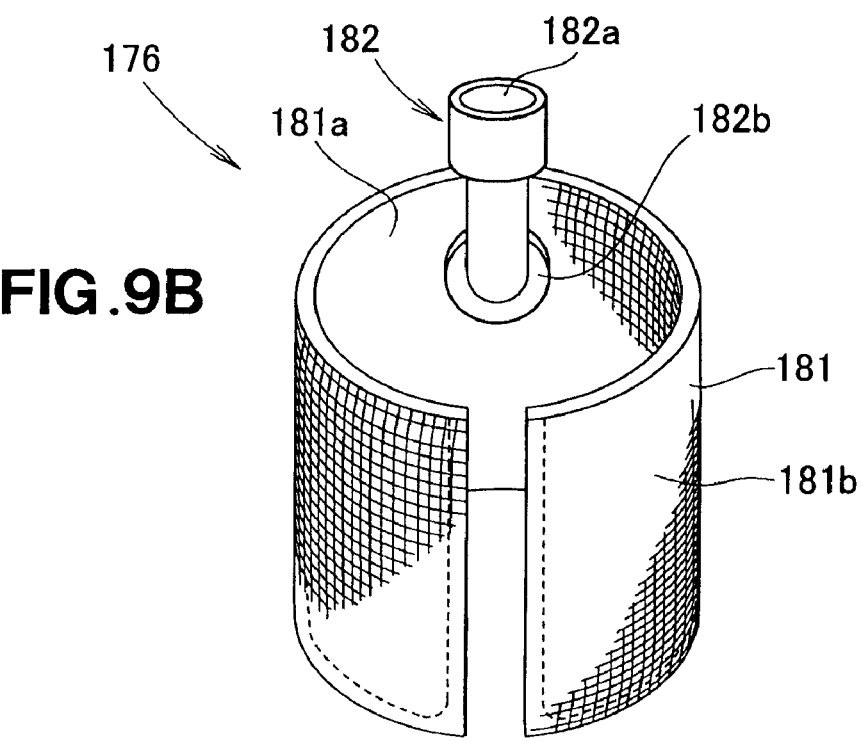

FIGS. 9A and 9B are views explanatory of the filter element 176 employed in the instant embodiment of the invention, of which FIG. 9A is a sectional view taken along line 9-9 of FIG. 8B and FIG. 9B is a perspective view showing the filter element 181 as accommodated in the filter case 171.

In FIG. 9A, the filter body 181 of the filter element 176 is in the shape of a bag formed by lapping a mesh 181B made of resin (e.g., polypropylene (PP)) on a three-layer, non-woven fabric 181A made of resin (e.g., polypropylene (PP)), then folding the lapped mesh 181B and fabric 181A in half in such a manner that the non-woven fabric 181A is positioned inside the mesh 181B and then welding together respective opposed side edge portions of the mesh 181B and fabric 181A. The filter body 181 is attached to an end portion of the connection port 182 in such a manner that it is sandwiched between an outer flange 182*b* that is molded integrally with the connection port 182 and extends through the wall thickness of the filter body 181 and an inner flange 182*c* that is located inside the filter body 181 and adhered to the outer flange 182*b* by ultrasonic welding, adhesive or the like or bonded to the outer flange 182*b* by fitting engagement with the latter.

FIG. 9B shows the filter body 181 rolled or cylindrically wound with the connection port 182 positioned inside the body 181 when the filter element 176 is to be put into the case 171 (see FIG. 8B). Depending on the size of the filter body 181, the filter body 181 may be rolled one or two times for being put into the filter case 171.

By putting the thus rolled or cylindrically-wound filter body 181 into the case 171, the filter body 181 can be compactly accommodated in the case 171, and thus, the case 171 may be formed in a reduced size. That is, reduction in size of the secondary fuel filter 143 can be achieved.

In FIG. 9B, the connection port 182 is connected to and held on an inner wall 181*a* of the rolled or cylindrically-wound filter body 181 and extends upward through the upper opening of the cylindrical filter body 181 in an outwardly-facing orientation. Therefore, no projecting portion is formed in an outer wall 181*b* of the rolled or cylindrically-wound portion of the filter body 181, which permits reduction in size of the filter case 171. In addition, because the inner space of the case 171 can be utilized efficiently in the aforementioned manner, the filter body 181 may have an increased area.

Because the pressure regulator 186 is disposed downstream of the filter body 181, the fuel, having been filtered through the filter body 181 of the secondary fuel filter 143, is returned to the main fuel tank 33 (see FIG. 3) via the pressure regulator 186. Therefore, dust contained in the fuel can be reduced considerably by the time the fuel returned to the main fuel tank 33 is to be again supplied and passed through the primary fuel filter 141 (see FIG. 2), so that clogging of the primary fuel filter 141 can be prevented with an enhanced reliability. Consequently, the replacement cycle of the primary fuel filter 141 can be prolonged, which permits an enhanced maintenance of the fuel supply device.

Further, because the pressure regulator 186 is formed integrally with the case 171 of the secondary fuel filter 143, the instant embodiment can significantly reduce the number of necessary component parts and hence the cost of the fuel supply device.

Furthermore, with the lower end face 191A of the regulator case 191 supported on the stepped portion 173C of the case body 173, the regulator case 191 can be sandwiched between the stepped portion 173C and the case cover 174 and thereby appropriately fixed to the case 171, by just attaching the case cover 174 to the case body 173 after fitting the regulator case 191 with the tubular portion 174*a* of the case cover 174. Thus, the instant embodiment can simplify the structure for mounting the pressure regulator 186 to the case 171.

Further, because the secondary fuel filter 143 is disposed downstream of the fuel pump 92 and the pressure regulator 186 is disposed downstream of the filter body 181 as set forth above, the fuel having passed through the filter body 181 is returned into the main fuel tank 33(see FIG. 2), via the pressure regulator 186, with most of the dust removed or filtered out from the fuel. Therefore, in the case where another filter, i.e. the primary fuel filter 141, is provided within the fuel pump 92, the replacement cycle of the primary fuel filter 141 can be prolonged, so that the instant embodiment can reduce the number of times maintenance work is to be performed.

Furthermore, with the fuel return pipe 135 extending upwardly from the pressure regulator 186 to the main fuel tank 33 as shown in FIG. 3, air accumulated within the secondary fuel filter 143 can readily flow into the main fuel tank 33 located above the secondary fuel filter 143, and thus, the fuel supply through the fuel passage can be effected smoothly.

Furthermore, the case 171 is constituted by the case body 173 and case cover 174, and the fuel suction port 171*a* and the fuel return port 171*c* are disposed offset from a center axis 200 of the case cover 174, as shown in FIG. 7. Thus, in the case where the pressure regulator 186 is provided near the fuel return port 171*c* as illustratively shown in FIG. 7, it is possible to enhance the layout and shape freedom of the pressure regulator 186, and thus, the case 171 can be made compact in size.

Furthermore, because the case 171 has the stepped portion 173C that projects radially outwardly and the lower end of the pressure regulator 186, i.e. the lower end face 191A of the regulator case 191, is supported on the stepped portion 173C, the structure for supporting the pressure regulator 186 can be simplified, so that the instant embodiment can avoid a substantial cost increase of the case 171 and hence the secondary fuel filter 143.

Figure 10A:
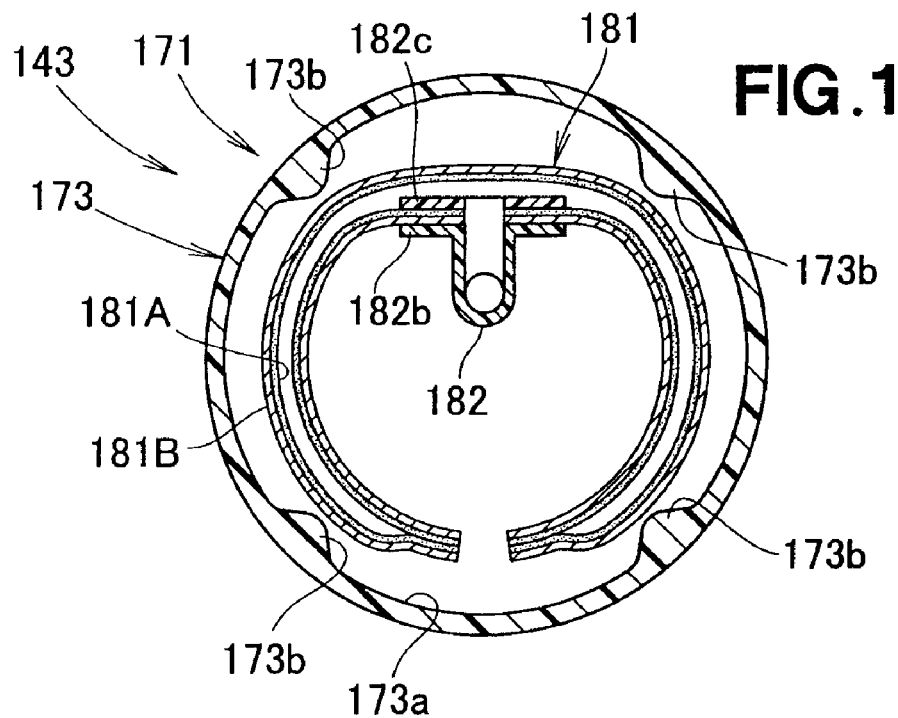
FIGS. 10A and 10B are cross-sectional views of the secondary fuel filter according to the instant embodiment of the invention.
Figure 10B:
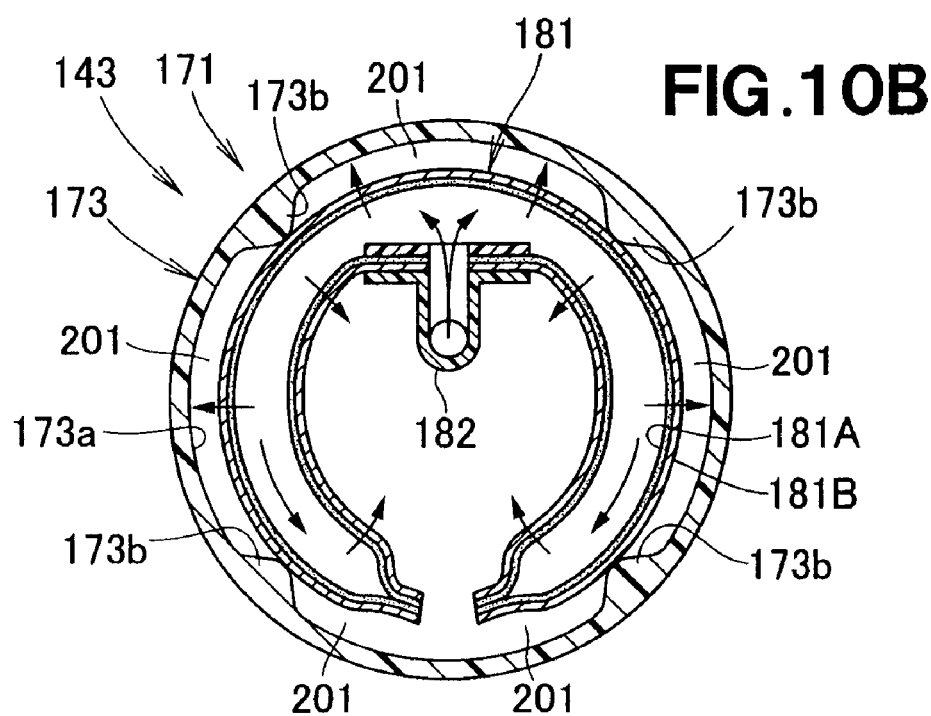

FIGS. 10A and 10B are cross-sectional views of the secondary fuel filter according to the instant embodiment of the invention.

FIG. 10A shows a state in which no fuel has been supplied into the filter body 181 of the secondary fuel filter 143, and in which the bag-shaped filter body 181 is left rolled and uninflated. In the figure, reference numeral 173a denotes the inner surface of the case body 173, and reference numeral 173b denotes a plurality of convex portions 173b projecting inwardly from the inner surface 173a of the case body 173.

FIG. 10B shows a state in which fuel has been supplied via the connection port 182 of the secondary fuel filter 143 into the filter body 181, and in which the filter body 181 has been inflated due to an increase in the inner fuel pressure. In this state, the supplied fuel gradually flows from the connection port 182 toward the discharge end as indicated by arrows while the fuel passes through the filter body 181 from the interior to the outside of the body 181. At that time, a plurality of gaps 201 are formed, by the plurality of inward convex portions 173b, between the inflated filter body 181 and the inner surface 173a of the case body 173, and the fuel flows out to the gaps 201 so that it flows to other regions through the gaps 201. In this way, the instant embodiment can prevent undesired stagnation of the fuel, thereby achieving an enhanced fuel filtering efficiency.

Furthermore, in the fuel supply device 150, as illustrated in FIGS. 2, 7, and 10A and 10B, the secondary fuel filter 143 is disposed outside the fuel tank 33, the outside of the secondary fuel filter 143 is covered with the filter case 171, and the pressure regulator 186 for regulating the pressure within the secondary fuel filter 143 is provided integrally with the filter case 171 so that the fuel having passed through the pressure regulator 186 is returned to the fuel tank 33. Further, the secondary fuel filter 143 is bag-shaped, and the fuel is filtered by the secondary fuel filter 143 as it passes through the filter body 181 from the interior to the outside of the filter body 181. Therefore, the filter body 181 can be accommodated compactly in the case 171, and thus the case 171 may be formed in a reduced size.

Furthermore, because the filter body 181 is inflated and stably retained in the inflated shape as the fuel is passed through the filter body 181 from the interior to the outside of the filter body 181, no particular frame member is necessary for the filter member 181. Therefore, the instant embodiment can reduce the number of necessary component parts of the filter body 181.

Moreover, because the filter body 181 to be accommodated within the case 171 can be readily changed in shape as necessary, the instant embodiment can enhance the layout freedom of the pressure regulator 186 and fuel return port 171c.

Note that, whereas the preferred embodiment has been described above in relation to the case where the pressure regulator 186 is provided integrally with the case cover 174 of the case 171 as shown in FIG. 7, the present invention is not so limited; for example, the pressure regulator 186 may be provided on the case body 173.

Furthermore, as set forth above, the filter body 181 is formed in a bag shape, the fuel is filtered as the fuel passes from the interior to the outside of the bag, and the mesh 181B, which is less prone to warping, sagging and the like than the non-woven fabric 181A, is disposed outside the non-woven fabric 181A. Thus, the filter body 181 can retain its shape inflated as the fuel is supplied into the bag-shaped filter body 181. Therefore, no particular frame structure is required for the filter body 181, and thus, the instant embodiment can achieve a substantial reduction in the cost of the secondary fuel filter 143. In addition, the secondary fuel filter 143 can be constructed in an even further reduced size.

Furthermore, the filter body 181 is supported partly by the convex portions 173b projecting inwardly from the inner surface 173a. Thus, when the fuel flows into the filter body 181, there can be secured the plurality of gaps 201 between the inflated filter body 181 and the inner surface 173a of the case body 173, and the fuel within the secondary fuel filter 143 is allowed to flow into the gaps 201 through the filter body 181. Consequently, the instant embodiment can suppress a decrease in the fuel flow rate, or stagnation of the fuel, and can thus enhance the fuel filtering efficiency.

Furthermore, because the primary fuel filter 141 is provided upstream of the fuel pump 92 (more specifically upstream of the drive section 153), as seen from FIGS. 2, 4 and 5, and the secondary fuel filter 143 made of non-woven fabric having a smaller pore size than the primary fuel filter 141 is provided downstream of the fuel pump 92, the primary fuel filter 141 may have a greater pore size. Thus, the instant embodiment can extend not only the life of the primary fuel filter 141 but also the life of the fuel pump 92 provided downstream of the primary fuel filter 141.

Moreover, with the secondary fuel filter 143 made of non-woven fabric, the fuel filtering efficiency can be enhanced to a significant degree, and the secondary fuel filter 143 may have a reduced surface area, so that the secondary fuel filter 143 can be constructed in a compact size. In addition, because the fuel filtering is performed cooperatively by the primary fuel filter 141 and secondary fuel filter 143, the instant embodiment can significantly extend the life of the secondary fuel filter 143 as compared to the case where only one such fuel filter is provided.

Whereas the instant embodiment has been described above in relation to the case where the bag-shaped filter body 181 is positioned within the case 171 in a rolled or wound form, the present invention is not so limited. For example, the filter body 181 may be positioned within the case 171 in a folded form. In this case, the shape of the case 171 is not limited to a tubular or cylindrical shape as noted above, and the case 171 may be of any other desired shape, such as a cube, parallelepiped or quadrangular pyramid.

Industrial Applicability

The above-described fuel supply device and fuel filter structure of the present invention are particularly suited for application to motorcycles.

The invention claimed is:
1. A vehicle fuel supply device comprising:
a fuel pump for supplying fuel within a fuel tank to an injector that jets the fuel toward an engine, said fuel pump being disposed within a fuel pump case that is affixed to an interior of the fuel tank, said fuel pump case defining a portion of a fuel passage extending upstream and downstream of said fuel pump;
a primary fuel filter received within said fuel pump case and disposed in the fuel passage upstream of the fuel pump; and
a secondary fuel filter disposed in the fuel passage downstream of the fuel pump,
wherein a pore size of the secondary fuel filter is smaller than a pore size of the primary fuel filter, and the secondary fuel filter is covered with a secondary filter case member and disposed along a body frame of the vehicle.

2. The vehicle fuel supply device of claim 1, wherein the secondary fuel filter is disposed rearwardly of the engine.

3. The vehicle fuel supply device of claim 1, wherein the secondary fuel filter is disposed laterally outwardly of the body frame.

4. The vehicle fuel supply device of claim 3, wherein the secondary fuel filter is attached to the body frame via a bracket, and the body frame has an inwardly concaved portion formed at a position corresponding to an inward surface of the secondary fuel filter.

5. The vehicle fuel supply device of claim 1, wherein an outward side surface of the secondary fuel filter is covered with an exterior member.

6. The vehicle fuel supply device of claim 1, further comprising a fuel supply pipe connected to a downstream side position of the secondary fuel filter and extending upwardly to a throttle body located above the secondary fuel filter.

7. The vehicle fuel supply device of claim 1, further comprising a fuel supply pipe extending upwardly from a fuel discharge port of the secondary filter case member to the injector, a fuel return port provided on an upper portion of the secondary filter case member, and a fuel return pipe extending upwardly from the fuel return port to the fuel tank.

8. The vehicle fuel supply device of claim 1, further comprising a pressure regulator provided integrally with the secondary filter case member, wherein the secondary fuel filter is disposed outside the fuel tank, the pressure regulator is adapted to regulate a pressure within the secondary fuel filter, fuel having passed through the pressure regulator being returned to the fuel tank, and the secondary fuel filter comprises a bag formed from a non-woven fabric that is adapted to filter the fuel as the fuel passes therethrough from an interior to an outside of the secondary fuel filter.

9. The vehicle fuel supply device of claim 8, wherein the pressure regulator is disposed downstream of the secondary fuel filter.

10. The vehicle fuel supply device of claim 8, further comprising a fuel return pipe extending upwardly from the pressure regulator to the fuel tank located above the pressure regulator.

11. The vehicle fuel supply device of claim 10, further comprising a fuel supply pipe for supplying the fuel from the fuel tank to the secondary fuel filter, wherein an outer diameter and length of the fuel supply pipe is different than an outer diameter and length of the fuel return pipe.

12. The vehicle fuel supply device of claim 8, wherein the secondary filter case member includes a case body and a case cover, and which further comprises a fuel suction port and a fuel return port that are disposed offset from a center axis of the case cover.

13. The vehicle fuel supply device of claim 12, wherein the secondary filter case member has a stepped portion projecting radially outwardly, and the pressure regulator has a lower end supported on the stepped portion.

14. The vehicle fuel supply device of claim 1, wherein the secondary fuel filter comprises a bag made of non-woven fabric and accommodated in the secondary filter case member in a rolled or wound configuration.

15. The vehicle fuel supply device of claim 14, wherein the secondary fuel filter is adapted to filter the fuel by passing the fuel through the bag from an interior to an exterior thereof.

16. The vehicle fuel supply device of claim 14, wherein an entry port to the secondary fuel filter is connected to an interior of the bag.

17. The vehicle fuel supply device of claim 14, wherein the secondary filter case member has a plurality of convex portions projecting inwardly from an inner surface thereof, and the secondary fuel filter is supported partly by the convex portions.

* * * * *